Figure 1:
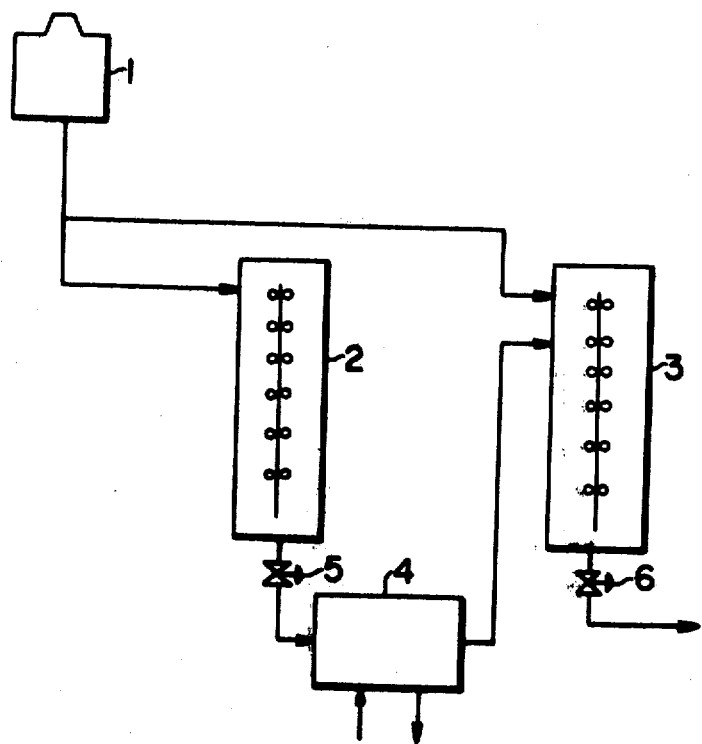

United States Patent [19]
Suzuki et al.

[11] 3,875,128
[45] Apr. 1, 1975

[54] PROCESS AND APPARATUS FOR PRODUCING ETHYLENE POLYMER

[75] Inventors: Iwao Suzuki, Chiba; Takeo Kamei, Tokyo; Ryuichi Sonoda, Niihama, all of Japan

[73] Assignee: Sumitomo Chemical Company, Limited, Osaka, Japan

[22] Filed: May 4, 1973

[21] Appl. No.: 357,182

[52] U.S. Cl............ 260/86.7, 260/87.3, 260/88.2 C, 260/94.9 P, 260/95 R, 260/95 C
[51] Int. Cl.......... C08f 1/00, C08f 3/04, C08f 19/04
[58] Field of Search............ 260/86.7, 87.3, 88.2 C, 260/94.9 P, 95 R, 95 C

[56] References Cited
UNITED STATES PATENTS
3,714,123   1/1973   Mancini et al.................... 260/63 R
FOREIGN PATENTS OR APPLICATIONS
765,501   1/1957   United Kingdom   ....... 260/94.9 P

*Primary Examiner*—Joseph L. Schofer
*Assistant Examiner*—John Kight
*Attorney, Agent, or Firm*—Stevens, Davis, Miller & Mosher

[57] ABSTRACT

An easily processible ethylene polymer having a molecular weight distribution different from that of a polymer conventionally produced in an autoclave reactor is obtained by a process for polymerizing ethylene or a mixture of ethylene with one or more other polymerizable monomers in a battery of autoclave reactors, which is characterized by connecting two or more autoclave reactors in series by means of piping provided with a heat exchanger; cooling the polymerization mixture withdrawn from the preceding reactor to a temperature above 120°C. but lower than the reaction temperature in the preceding reactor by 20°C. or more; and introducing the cooled polymerization mixture into the succeeding reactor to continue the polymerization. The molded articles, sheeting, and film prepared from the polymer thus obtained are markedly improved in optical properties.

4 Claims, 1 Drawing Figure

PROCESS AND APPARATUS FOR PRODUCING ETHYLENE POLYMER

This invention relates to an improved process and apparatus for producing a homopolymer or copolymer of ethylene under a high pressure.

FIG. 1 is a simplified process flow chart according to this invention. In FIG. 1, 1 is a super-high pressure gas compressor, 2 and 3 are autoclave reactors, 4 is a heat exchanger, and 5 and 6 are outlet valves.

It has been well known that a high molecular substance having favorable properties is obtained by polymerizing ethylene or a mixture of two or more monomers, of which ethylene is a major component, under a pressure of 500 kg/cm$^2$ or higher (ordinarily 1,000 to 3,000 kg/cm$^2$) and at a reaction temperature of 30° to 500°C. (ordinarily 50° to 300°C.) using oxygen or a compound capable of readily generating a free radical as catalyst.

For carrying out the above polymerization reaction on an industrial scale, there are two types of reactors, i.e., an autoclave reactor and a tubular reactor.

The autoclave reactor is a reactor in substantially cylindrical or nearly cylindrical form of a relatively large diameter, the ratio of length to diameter being usually 5 to 20, and generally provided with a means for stirring. The tubular reactor is a reactor in substantially cylindrical form of a relatively small diameter, the ratio of length to diameter being usually 300 to 40,000 or thereabout. It is generally known that the products obtained from each of these autoclave and tubular reactors have respective features in quality.

It is well known that in polymerizing ethylene or a mixture of two or more monomers, of which ethylene is a major component, by using a stirred autoclave reactor, the yield of ethylene polymer or copolymer per single pass of the monomer or monomers through the reactor (the weight percent of the polymer being formed per unit weight of the reactant gas fed to the reactor) is governed by heat balance in the reactor when operated on an industrial scale, though depending on the reaction temperature and the type and amount of the catalyst used. Since a fairly large amount of heat is evolved in polymerization of ethylene, it is usually removed by utilizing the difference in sensible heat of the monomer between the feeding temperature and the reaction temperature and by external cooling of the reactor. However, the yield of polymer has its limit which is usually 10 to 20 percent by weight in the case of an autoclave reactor.

An object of this invention is to provide an improved apparatus for the polymerization of ethylene or a mixture of monomers containing ethylene as major component, which comprises autoclave reactors and a heat exchanger. This apparatus is easy to operate and, in addition, improved in the yield per single pass through the reactor, thus affording an improved productivity.

Another object of this invention is to provide a process for producing a homo- or co-polymer of ethylene having favorable physcial properties in which such defects as found in the product produced by a single autoclave reactor process have been eliminated.

This invention provides firstly an improved process for producing an ethylene polymer by polymerization of ethylene alone or a mixture of ethylene with one or more other copolymerizable monomers in a battery of autoclave reactors, which is characterized by connecting two or more autoclave reactors in series by means of piping provided with a heat exchanger, each of said reactors being provided with an outlet reducing valve and a stirrer; cooling the polymerization reaction mixture withdrawn from the preceding autoclave reactor to a temperature above 120°C. but lower than the reaction temperature in the preceding reactor by 20°C. or more, and introducing the cooled reaction mixture into the succeeding autoclave reactor to continue polymerization, and secondly an apparatus for use in the process.

According to this invention, compressed cold ethylene or a cold mixture of ethylene with other copolymerizable monomers is fed from a gas compressor to the first reactor of a battery of two or more stirred autoclave reactors arranged in series, allowed to react by addition of a catalyst to reach a certain conversion while utilizing to full extent the increase in sensible heat of the cold gas, and the resulting reaction mixture comprising the polymerizate and the unreacted monomer(s) is sent to the succeeding autoclave reactor to allow the reaction again to proceed in order to increase the conversion. In the middle of the piping connecting the first autoclave reactor to the succeeding one, is provided a heat exchanger for cooling the reaction mixture from the first reactor in order to increase conversion in the succeeding reactor. A reducing valve provided at the outlet of each reactor permit free control of the reaction pressure and temperature in each reactor by manipulation of said reducing valve. In this invention, the abovesaid intermediate cooling between adjacent reactors is important, and the cooling should be done so that the temperature may decrease by 20°C. or more.

The greater the temperature decrease in excess of 20°C., the higher will be the conversion in the succeeding autoclave reactor. However, cooling should not be done to a temperature below 120°C. If the temperature decreases below 120°C., there might occur blocking of the piping or a pressure loss due to precipitated polymerizate. To avoid such troubles, it might be necessary to add a separator between adjacent reactors to separate the reaction mixture into the polymerizate and the unreacted monomer gas, giving rise to complication of the process which would destroy advantages of this invention.

The known processes which make use of two or more autoclave reactors connected in series for polymerization of ethylene include a process of Brit. Pat. No. 762,592 and a process of Brit. Pat. No. 765,501. In the process of Brit. Pat. No. 762,592, a hard-grade polyethylene and a soft-grade polyethylene are produced and mixed. Therefore, the process is quite different from the present process in which the reaction mixture is cooled between two consecutive reactors of a battery of two or more autoclave reactors for the purpose of increasing the conversion. In the process of Brit. Pat. No. 765,501, the reaction mixture is cooled between two consecutive reactors of a battery of two or more autoclave reactors and again heated after addition of a catalyst to continue the reaction in order to increase the conversion of ethylene. However, the cooled reaction mixture passes through a separator provided subsequent to the cooling means to be separated into the polymerizate and the unreacted monomer gas, thus bringing about undesirable complication in both apparatus and operation.

According to this invention, the reaction mixture is cooled by means of a heat exchanger provided in the middle of a piping connecting each reactor of a battery of two or more autoclave reactors in series. Since the cooling is controlled so that the temperature still remains above 120°C., the reaction mixture can be sent as such to the succeeding reactor to continue the polymerization without having been separated into the polymerizate and the unreacted monomer gas. Accordingly, the apparatus is quite simple and the operation is easy. Such features are of industrial advantage to this invention.

In this invention, reaction pressure and reaction temperature in each autoclave reactor can be selected very freely. The maximum reaction pressure in each reactor is less than that in immediately preceding reactor by a pressure loss in the piping connecting both reactors. Taking this fact into consideration, the reaction pressure can be regulated otherwise freely by means of a reducing valve provided at the outlet of each reactor. The reaction pressure is generally 500 – 4,000 kg/cm$^2$., preferably 1,000 – 3,000 kg/cm$^2$. The reaction temperature in each reactor can be controlled independent of other reactors. The reaction temperature is generally 140° – 300°C.

The catalysts usable in this invention include oxygen, various organic peroxides, azo compounds and the like. These catalysts are used each alone or in mixtures of two or more. Examples of individual catalysts include dialkylperoxides, such as for example, di-t-butylperoxide, diethylperoxide, and the like; tert-alkylpercarboxylates, such as for example, t-butylperoxide, t-butylperacetate, and the like; ketone peroxides, such as for example, methyl ethyl ketone peroxide, and the like; alkylhydroperoxides, such as for example, t-butylhydroperoxide, and the like; acyl peroxides, such as for example, acetyl peroxide, benzoyl peroxide, dioctanoyl peroxide, and the like; dicarboxylates, such as for example, diisopropylperoxydicarbonate and the like; organic peracides, such as for example, succinic acid peroxide and the like; oximes, such as for example, acetone oxime and the like; azines, such as for example, benzylidene azine and the like; and azo compounds, such as for example, azobis(isobutyronitrile), 2,2'-azobis(methylisobutylate), 2,2'-azobis(isobutylamide) and the like.

The amount of catalysts to be used is 5 – 3,000 parts by weight in the front reactor and 5 – 2,000 parts by weight in the rear reactor for 1,000,000 parts by weight of ethylene.

According to this invention, not only homopolymer of ethylene but also copolymers of ethylene with various other comonomers are obtained. Comonomers to be used in copolymerization of ethylene are vinyl esters, such as for example, vinyl acetate, vinyl formate, vinyl butylate, and the like; acrylates and methacrylates, such as for example, methyl acrylate, ethyl acrylate, methyl methacrylate, ethyl methacrylate and the like; acrylamides and methacrylamides, such as for example, methyl acrylamide, ethyl acrylamide, methyl methacrylamide, ethyl methacrylamide and the like; vinyl ethers, such as for example, methyl vinyl ether, t-butyl vinyl ether and the like; vinyl ketones, such as for example, methyl vinyl ketone and the like; dicarbonates, such as for example, diethyl fumarate, diethyl maleate and the like; acid unhydrides, such as for example, maleic unhydride and the like; and styrene and the like.

According to this invention, by proper selection of reaction conditions, there is obtained an easily processible polymer which is different in molecular weight distribution from the polymer or copolymer obtained by use of a conventional autoclave reactor. The molded articles, sheeting and film obtained from the polymer prepared by the process of this invention are markedly improved in optical properties.

The invention is illustrated below with reference to Examples, but the scope of the invention is not limited to these Examples.

EXAMPLE 1

Ethylene is compressed by means of a superhigh pressure gas compressor 1 to a pressure of 1,500 kg/cm$^2$ and cooled to 30°C. by passing through a cooler. Ninety percent of the cooled ethylene is fed to an autoclave reactor 2 and the remaining 10 percent to an autoclave reactor 3. To the autoclave reactor 2, is added 1/10,000 part of di-tert-butyl peroxide as catalyst for 1 part of the ethylene fed to to said reactor and polymerization is allowed to proceed at 250°C. In the first reactor, about 15 percent of ethylene is converted into polyethylene. After having been cooled to 170°C., the reaction mixture is fed to the autoclave reactor 3. To the reactor 3, is added 1/30,000 part of fresh di-tert-butyl peroxide as catalyst to continue the polymerization at 260°C. The reaction pressure is adjusted to 1,200 kg/cm$^2$ by means of outlet valves 5 and 6. The reaction mixture is withdrawn, and released of pressure in a separator, whereby the mixture is separated into the polymerizate and the unreacted ethylene which is recycled for reuse. The overall conversion attained by the procedure mentioned above was about 25 percent, whilst the conversion was 17 percent in the case where single autoclave reactor was used.

The polymer thus obtained has little odor and is improved in processibility as indicated by the decrease in working pressure in the extrusion die and the decrease in power consumption for extrusion. When formed into molded articles, sheet and film, the polymer showed increase in transparency and improvements in impact strength, tear strength, and drawdown.

EXAMPLE 2

Using the same apparatus as in Example 1, ethylene is compressed to a pressure of 2,500 kg/cm$^2$ and cooled to 30°C. by passing through a cooler. Seventy-five percent of the cooled ethylene is introduced into an autoclave reactor 2 and the remaining 25 percent to an autoclave reactor 3. To the autoclave reactor 2, is added 1/2,000 part of dioctanoyl peroxide as catalyst for 1 part of the ethylene introduced into said reactor and polymerization is allowed to proceed at 190°C. The reaction pressure is adjusted to 2,400 kg/cm$^2$ by means of an outlet valve 5. After having been cooled in a heat exchanger to 140°C., the reaction mixture is introduced into the autoclave reactor 3. To the reactor 3, is added 1/30,000 part of fresh di-tert-butyl peroxide as catalyst to continue the polymerization at 250°C. The reaction pressure is adjusted to 1,200 kg/cm$^2$ by means of an outlet valve 6. The reaction mixture is withdrawn, and released of pressure in a separator, whereby the mixture is separated into the polymerizate and the unreacted ethylene which is recycled for reuse. The overall conversion attained by the above-mentioned procedure was about 20 percent.

On the other hand, using an apparatus comprising single autoclave reactor, ethylene is compressed to a pressure of 2,500 kg/cm$^2$, cooled to 30°C. by passing through a cooler, and allowed to polymerize at 190°C. after addition of 1/1,500 part of dioctanoyl peroxide as catalyst for 1 part of ethylene which has been fed. The reaction pressure is adjusted to 2,400 kg/cm$^2$ by means of the outlet valve. The reaction mixture is withdrawn, and released of pressure in a separator, whereby the mixture is separated into the polymerizate and the unreacted ethylene which is recycled for reuse. The overall conversion attained by the above-mentioned procedure was 13.5 percent.

Characteristic properties of the polyethylene obtained by the process of this invention were compared with those of the polyethylene obtained by using single autoclave reactor. The results obtained are as shown in the following Table. The melt index and the density were measured according to JIS K 6760 - 1966. Optical properties were measured on a film, 0.03 mm in thickness and 180 mm in width, prepared by extrusion at a resin temperature of 160°C., according to JIS K 6714 - 1961 for haze and ASTM D 523 - 53T for gloss. The drawdown was evaluated by referring to the minimum thickness of film obtainable by stable extrusion for 10 minutes.

Table

|  | Polymer (this invention) | Polymer (reference) |
| --- | --- | --- |
| Melt index, g/10 min. | 2.0 | 2.0 |
| Density, g/cc | 0.924 | 0.924 |
| Optical property |  |  |
| Haze, % | 5.6 | 7.6 |
| Gloss, % | 107 | 78 |
| Processibility |  |  |
| Drawdown, μ | 12 | 20 |
| Pressure in extrusion die, kg/cm$^2$ | 232 | 263 |

The polyethylene obtained according to this invention was found superior in processability and optical properties, as compared with the polyethylene obtained by a single autoclave reactor process.

What is claimed is:

1. In a process for producing a homopolymer or copolymer of ethylene by polymerizing ethylene alone or a mixture of ethylene with one or more other polymerizable monomers in a battery of autoclave reactors, the improvement which comprises connecting two or more autoclave reactors in series by means of piping provided with a heat exchanger; cooling the polymerization reaction mixture withdrawn from the preceding autoclave reactor by passing through said heat exchanger to a temperature above 120°C. but lower than the reaction temperature in the preceding autoclave reactor by 20°C. or more; and introducing the cooled polymerization reaction mixture into the succeeding autoclave reactor to continue the polymerization.

2. A process according to claim 1, wherein the polymerization reaction is carried out at a temperature from 140° to 300°C.

3. A process according to claim 1, wherein the monomer copolymerizable with ethylene is at least one member selected from the group consisting of vinyl acetate, methyl methacrylate and styrene.

4. A process according to claim 1, wherein the reaction pressure is from 500 to 4,000 kg/cm$^2$.

* * * * *